(12) United States Patent
Kawahara et al.

(10) Patent No.: US 7,137,706 B2
(45) Date of Patent: Nov. 21, 2006

(54) FAN APPARATUS, METHOD OF MANUFACTURING FAN APPARATUS, PROJECTION TYPE DISPLAY DEVICE AND ELECTRONIC DEVICE

(75) Inventors: Shoji Kawahara, Okayama (JP); Takehiro Okada, Osaka (JP); Makoto Hoshino, Osaka (JP); Koji Yoshioka, Oita (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 117 days.

(21) Appl. No.: 10/450,964

(22) PCT Filed: Aug. 28, 2002

(86) PCT No.: PCT/JP02/08637

§ 371 (c)(1),
(2), (4) Date: Dec. 4, 2003

(87) PCT Pub. No.: WO03/021110

PCT Pub. Date: Mar. 13, 2003

(65) Prior Publication Data

US 2004/0071553 A1 Apr. 15, 2004

(30) Foreign Application Priority Data

Sep. 3, 2001 (JP) .............................. 2001-265511

(51) Int. Cl.
| | |
|---|---|
| G03B 21/16 | (2006.01) |
| F21V 29/00 | (2006.01) |
| H04N 5/74 | (2006.01) |
| G02F 1/1333 | (2006.01) |
| F03B 3/12 | (2006.01) |

(52) U.S. Cl. .................... 353/57; 353/61; 362/264; 362/294; 362/373; 348/748; 349/161; 416/183; 416/198 R; 416/223 R

(58) Field of Classification Search ................ 353/57, 353/52, 58, 60, 61; 362/257, 262, 264, 294, 362/345, 362, 373; 348/739, 744, 748; 349/161; 416/183, 198 R, 223 R
See application file for complete search history.

(56) References Cited

U.S. PATENT DOCUMENTS 4,489,366 A * 12/1984 Rozniecki ................... 362/270

(Continued)

FOREIGN PATENT DOCUMENTS

JP 25-4176 7/1950

(Continued)

OTHER PUBLICATIONS

Japanese International Search Report for PCT/JP02/08637, dated Dec. 17, 2002.

(Continued)

Primary Examiner—W. B. Perkey
Assistant Examiner—Rochelle Blackman
(74) Attorney, Agent, or Firm—RatnerPrestia

(57) ABSTRACT

With a trend toward a higher intensity projection type liquid crystal display device to further increase brightness of a projection screen, rated input power of a light source lamp increases, which makes essential a fan apparatus for cooling the light source lamp, etc. Such a fan apparatus would require a light-shielding member which causes the number of parts to increase. The present invention provides a fan apparatus provided with a rotor section that can be rotated/driven around a predetermined rotation axis and a propeller section including propeller blades and attached to the rotor section arranged in such a way as to substantially shield light parallel to the rotation axis.

8 Claims, 10 Drawing Sheets

U.S. PATENT DOCUMENTS

| | | | |
|---|---|---|---|
| 6,132,170 A * | 10/2000 | Horng | 415/178 |
| 6,434,002 B1 * | 8/2002 | Wei | 361/697 |
| 6,488,472 B1 | 12/2002 | Miyazawa | |

FOREIGN PATENT DOCUMENTS

| | | |
|---|---|---|
| JP | 50-011854 | 2/1975 |
| JP | 57-179025 | 11/1982 |
| JP | 58-22495 | 2/1983 |
| JP | 62-52160 | 11/1987 |
| JP | 1-315697 | 12/1989 |
| JP | 02-099295 | 8/1990 |
| JP | 02-196193 | 8/1990 |
| JP | 02-252999 | 10/1990 |
| JP | 05-061746 | 8/1993 |
| JP | 05-064498 | 8/1993 |
| JP | 06-059238 | 3/1994 |
| JP | 6-264897 | 9/1994 |
| JP | 6-307397 | 11/1994 |
| JP | 7-27090 | 1/1995 |
| JP | 08-121386 | 5/1996 |
| JP | 09-168511 | 6/1997 |
| JP | 09-304834 | 11/1997 |
| JP | 11-119181 | 4/1999 |
| JP | 11-167166 A | 6/1999 |
| JP | 11-202412 | 7/1999 |
| JP | 11-248198 | 9/1999 |
| JP | 3071456 | 6/2000 |
| JP | 2001-501284 | 1/2001 |
| JP | 2001-115993 A | 4/2001 |
| JP | 3078820 | 4/2001 |
| JP | 2001-214894 A | 8/2001 |
| JP | 2001-227497 | 8/2001 |
| WO | WO 99/06712 | 2/1999 |
| WO | WO 00/38896 | 7/2000 |

OTHER PUBLICATIONS

English translation of Japanese Office Action for Application No. JP 2003-525152 dated Jan. 25, 2005.

Japanese Office Action corresponding to application No. 2003-525152 dated May 31, 2005 (w/partial English translation).

Japanese Office Action for JP 2003-525152, dated Nov. 9, 2004.

* cited by examiner

FAN APPARATUS, METHOD OF MANUFACTURING FAN APPARATUS, PROJECTION TYPE DISPLAY DEVICE AND ELECTRONIC DEVICE

THIS APPLICATION IS A U.S. NATIONAL PHASE APPLICATION OF PCT INTERNATIONAL APPLICATION PCT/JP02/08637.

TECHNICAL FIELD

The present invention relates to a fan apparatus, method of manufacturing the fan apparatus, projection type display device and electronic device applicable for the purpose of cooling an electronic device such as a projection type display device. The projection type display device may be of the kind that decomposes white light from a light source lamp into light beams of three colors; red, blue and green, and lets each light beam pass through a light bulb composed of, for example, a liquid crystal panel. The light beams are then modulated according to image information, color-combined after modulation and then enlarged and projected onto a screen through a projection lens unit.

BACKGROUND ART

For a projection type liquid crystal display device in recent years, a high resolution light bulb device, for example, a liquid crystal panel unit is used to project image information more clearly and brightness is continuously increased to light up the projection screen brighter.

More specifically, with the widespread use of personal computers such as notebook personal computers, there is a strong demand for a small, light projection type display device with excellent portability as an image output apparatus for a notebook personal computer which is widely used for electronic presentations. Furthermore, a projection type display device, etc., for a home theater is also becoming widespread.

On the other hand, as the brightness increases, rated input power of a light source lamp also increases, which makes it more important to secure cooling performance for cooling the light source lamp, etc.

With reference now to FIGS. 5 to 7, a conventional projection typed is play device will be explained. FIG. 6 is a plan view of a conventional projection type display device using a cooling apparatus around a light source lamp used in a projection type display device that modulates light signals through a light bulb made up of a liquid crystal panel according to image information, color-combines modulated light beams of different colors after modulation, enlarges and projects the light beams on a screen through a projection lens unit. Furthermore, FIG. 7 is a right side view of the same device. FIG. 5 illustrates a conventional axial flow fan to show an overview of a cooling fan 6 which is a general axial flow fan used in the same device.

As shown in FIG. 6, the conventional projection type display device includes a light source lamp unit 1, an irradiation optical unit 2 that condenses light from the above-described light source lamp unit 1, three liquid crystal panel units 3 consisting of R, G and B liquid crystal panels as light bulbs for optically generating image information from the condensed light, a color combination system unit 4 that color-combines the optical information of the liquid crystal panel units 3, a projection optical unit 5 that enlarges and projects the image information onto a screen, a cooling fan 6 for cooling the light source lamp unit 1 and its periphery, a light-shielding member 7 for preventing unnecessary light of the light source lamp unit 1 from leaking outward and a housing 8 provided with a exhaust opening 9 for circulating exhaust air of the cooling fan 6.

Here, the cooling mechanism of such a projection type display device will be explained.

As shown in FIG. 6, the high temperature atmosphere of the light source lamp unit 1 is led through the light-shielding member 7 and exhausted out of the housing through the exhaust opening 9 provided in the housing 8 due to a pressure difference produced before and after propellers as air blowing means by rotation of the cooling fan 6. In this way, the heat of the atmosphere inside the housing 8 is transferred and cooling is realized.

More specifically, propellers 12 form an air blowing means formed integral with the rotor of a motor 11 and rotate as the motor 11 rotates. Thus, the air is circulated in the axial direction inside an air duct formed in a housing 10 that holds the motor generally aligned with the rotation center of the motor 11.

However, such a conventional projection type display device requires a large light-shielding member to prevent light from leaking toward the outside of the set through the exhaust opening that circulates exhaust air of the cooling fan, which constitutes a major limiting factor against downsizing or price-reduction of the apparatus. Further, processing speed of electronic devices such as personal computers have been drastically improved, and thus the temperature inside the housing tends to rise owing to the location of a circuit board, etc., on which the CPU and various drive ICs are mounted. For this reason, it is necessary to provide a large axial flow fan or dust-proof structure to prevent dust, etc., from entering the set, causing complexity and upsizing of the structure).

Furthermore, the above-described conventional projection type display device has excessive air blowing resistance of the cooling fan caused by such a light-shielding member, which requires high-speed drive of the cooling fan to cope with an increased amount of heat generated at the high-power light source lamp unit, producing loud noise and interfering with audiovisual functions.

DISCLOSURE OF THE INVENTION

In view of the above-described problems, it is an object of the present invention to provide a fan apparatus, method of manufacturing the fan apparatus, projection type display device, and electronic device, eliminating the need for any light-shielding member and with fewer parts.

A first aspect of the present invention is a fan apparatus comprising:

a rotor section capable of rotating/driving around a predetermined rotation axis; and a propeller section attached to said rotor section, having a plurality of propeller blades arranged in such a way as to substantially shield light parallel to said rotation axis.

A second aspect of the present invention is the fan apparatus according to the first aspect of the present invention, further comprising a case which surrounds the edges of said propeller blades with a predetermined space and is left open on the front and back of said propeller blades, wherein flanges overhang said case in such a way as to shield light parallel to said rotation axis, which is incident or is to be incident upon said predetermined space.

A third aspect of the present invention is the fan apparatus according to the first aspect of the present invention, further comprising:

a case which surrounds the edges of said propeller blades with a predetermined space and is left open on the front and back of said propeller blades; and a motor support frame attached to said case, for supporting a motor to rotate/drive said rotor section, wherein said motor support frame is provided with a predetermined light-shielding member in such a way as to shield light parallel to said rotation axis, which is incident or is to be incident upon said predetermined space.

A fourth aspect of the present invention is the fan apparatus according to the first aspect of the present invention, wherein each of said propeller blades is constructed of a combination of two or more small propeller blades.

A fifth aspect of the present invention is a method of manufacturing the fan apparatus according to the first aspect of the present invention , comprising:

a fan element molding step of molding a plurality of fan elements made up of a rotor section element that constitutes said rotor section and a propeller section element that constitutes said propeller section; and a rotor section element connecting step of connecting rotor section elements of said plurality of molded fan elements, wherein the individual propeller blades of said propeller section element are arranged in such a way as to constitute said propeller blades.

A sixth aspect of the present invention is a projection type display device comprising:

light-emitting means of emitting light;

projecting means of projecting an optical image onto a predetermined screen using said emitted light; and a fan apparatus according to the first aspect of the present invention for cooling at least said light-emitting means.

A seventh aspect of the present invention is the projection type display device according to the sixth aspect of the present invention, further comprising a housing for housing said light-emitting means, said projecting means and said fan apparatus, wherein the wall section of said housing is provided with an opening that allows air intake and/or exhaust for said cooling, and said fan apparatus is placed separately toward the inside of said housing by a predetermined distance from said opening.

An eighth aspect of the present invention is an electronic device comprising:

a predetermined circuit which operates with heat dissipation; and a fan apparatus according to a first aspect of the present invention, for cooling at least said predetermined circuits.

A ninth aspect of the present invention is the electronic device according to the eighth aspect of the present invention, further comprising a housing for housing said predetermined circuit and said fan apparatus, wherein the wall section of said housing is provided with an opening that allows air intake and/or exhaust for said cooling, and said fan apparatus is placed separately toward the inside of said housing by a predetermined distance from said opening.

DESCRIPTION OF SYMBOLS

Figures 1A, 1B:
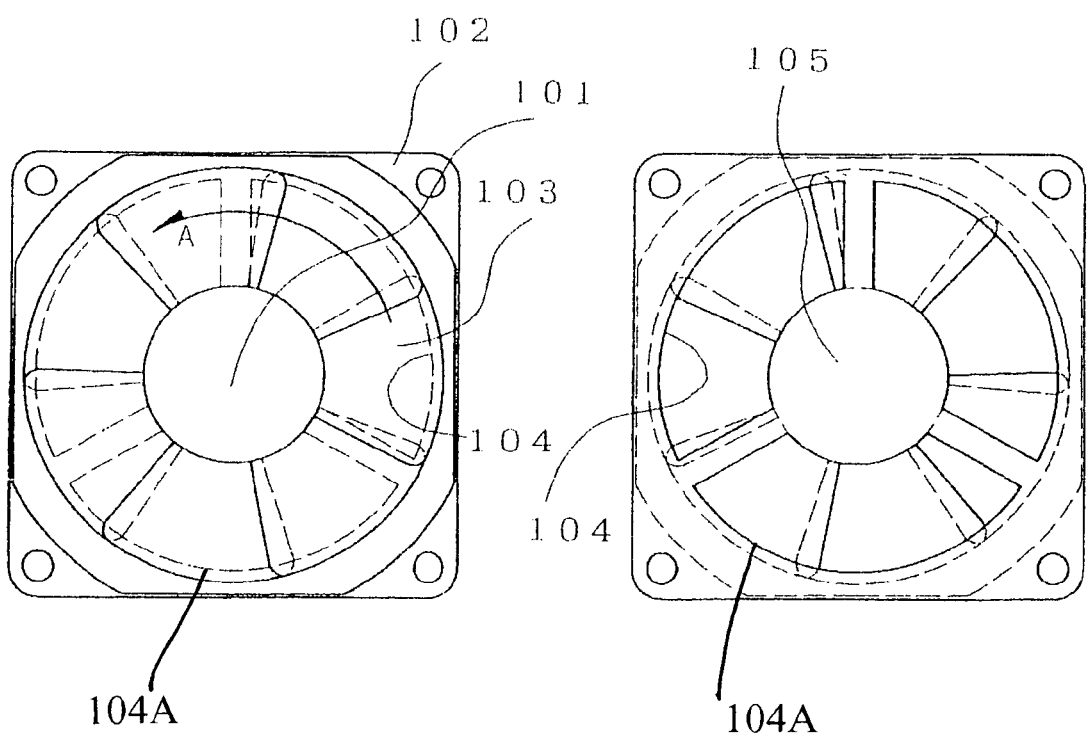
FIG. 1(a) illustrates an axial flow fan according to Embodiment 1 of the present invention viewed from the air intake side along the axial direction.
FIG. 1(b) illustrates an axial flow fan according to Embodiment 1 of the present invention viewed from the air exhaust side along the axial direction.

1 light source lamp unit
2 irradiation optical unit
3 liquid crystal panel unit
4 color combination system unit
5 projection optical unit
6 cooling fan
7 light-shielding member
8 housing
9 exhaust opening
10 housing
11 motor
12 propellers
13 air duct
101 motor
102 housing
103 propeller blades
104 air duct
105 stator side of a motor
201 axial flow fan
301 housing
302 heating members
303 exhaust opening
304 axial flow fan

BEST MODE FOR CARRYING OUT THE INVENTION

With reference now to the attached drawings, embodiments of the present invention will be explained below.

Embodiment 1

First, with reference to mainly FIGS. 1(a) and (b) a configuration of an axial flow fan of this embodiment will be explained. FIG. 1(a) illustrates an axial flow fan according to Embodiment 1 of the present invention viewed from the air intake side along the axial direction and FIG. 1(b) illustrates an axial flow fan according to Embodiment 1 of the present invention viewed from the air exhaust side along the axial direction.

In FIGS. 1(a) and 1(b), the rotation center on the stator side of a motor 101 which is a rotation drive source is fixed to the center of a motor support frame provided in a plurality of spokes without interrupting the air flow, using a housing 102 which serves as the housing of the fan.

A plurality of propeller blades 103 formed integral with the outer radius side of the rotor which constitutes a rotor of the motor 101 provide the means of blowing air. The propeller blades 103 are formed in such a way that mutually neighboring propeller blades overlap with each other in a projective view from the axial direction in an area within the inner diameter 104A of an air duct 104. This prevents the back side in the axial direction (that is, the air intake side) from being seen through a gap between the mutually neighboring propeller blades 103 and a gap between the air duct 104 and propeller blades 103 from the surface side in the axial direction (that is, the air exhaust side).

The air duct 104 is an air duct for the air circulated through rotation of the propeller blades 103 and formed in such a way as to generally share the rotation axis of the motor 101 as its axis. The air duct 104 is expressed by a dotted line in FIG. 1(a) and a solid line in FIG. 1(b). Furthermore, the inner diameter 104A of the air duct 104 is smaller than the outer diameter of the rotating propeller blades 103 and an offset is formed in such a way that it slightly increases toward the air exhaust side to prevent the rotating propeller blades 103 from touching the air duct 104.

Further, the means including the rotor of this embodiment corresponds to the rotor section of the present invention and the means including the propeller blades 103 corresponds to the propeller section of the present invention. Furthermore, the housing 102 corresponds to the case of the present invention. The axial flow fan in this embodiment corresponds to the fan apparatus of the present invention.

Next, an operation of the axial flow fan in this embodiment will be explained.

The motor 101 held in the center of the motor support frame provided in the housing 102 is rotated in the direction indicated by an arrow A by a supply voltage.

Furthermore, the plurality of propeller blades 103 formed integral with the rotor side which serves as the rotator of the motor 101 are also rotated in the direction indicated by the arrow A.

As a result, a pressure difference is produced at both ends of the intake and exhaust sides of the propeller blades 103 and air is taken in from the intake side shown in FIG. 1(a). The intake air is led through the propeller blades 103, through the inner radius side of the air duct 104 formed in the housing 102 and exhausted to the exhaust side shown in FIG. 1(b).

Thus, the axial flow fan of this embodiment includes the motor which serves as a rotation drive source, a plurality of air blowing means, formed integral with the perimeter on the rotor side of the motor, which rotates together with the motor and sends air in the axial direction of the motor, a housing that forms one body with a circular air duct having an inner diameter smaller than an external diameter of the above-described air blowing means and holds the stator side of the motor as one body in such a way that the rotation center of the motor almost aligns with the center of the above-described air duct, characterized in that the plurality of air blowing means are constructed in such a way that the plurality of neighboring air blowing means overlap with one another with no gap between the air blowing means and air duct in a projective view from the axial direction of the motor, so that the air intake side cannot generally be seen from the air exhaust side inside the air duct. Here, the air blowing means used for the above-described axial flow fan are shaped as propeller blades of the axial flow fan.

The axial flow fan characterized as shown above, in a configuration with a high degree of freedom without using any light-shielding member or dust-proof member can (1) effectively cool the device without letting out unnecessary light such as light from the light source lamp unit, (2) prevent dust from entering the set, (3) drastically reduce noise caused by air blowing without deteriorating the cooling performance because there is no more air blowing resistance by the light-shielding member or dust-proof member, (4) improve the quality of the set because it can be used as a cooling fan when it is desirable to make the interior of the set invisible to the user, and (5) promote price-reduction or down-sizing by eliminating the need for the light-shielding member or dust-proof member and thereby reducing the number of parts.

Embodiment 2

Figure 2:
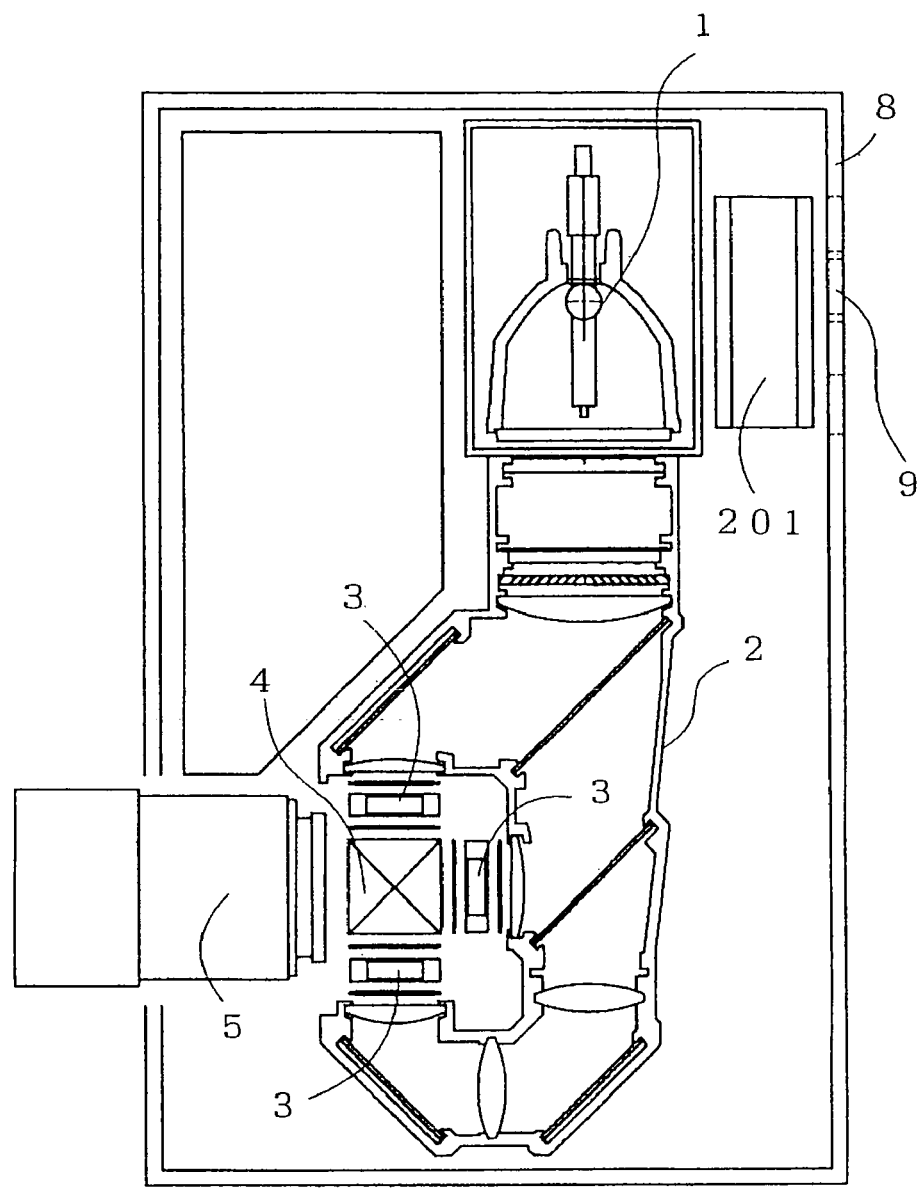
FIG. 2 is a plan view of a projection type display device according to Embodiment 2 of the present invention.
Figure 3:
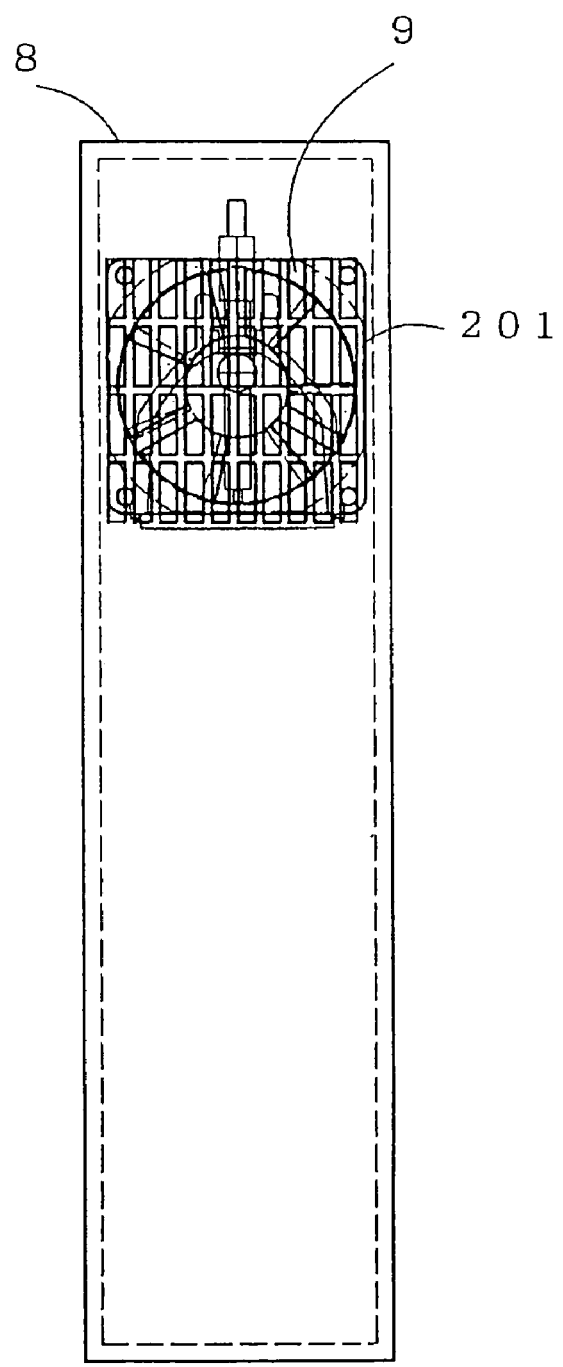
FIG. 3 is a right side view of the projection type display device according to Embodiment 2 of the present invention.

First, a configuration of a projection type display device of this embodiment will be explained mainly with reference to FIGS. 2 and 3. FIG. 2 is a plan view of a projection type display device according to Embodiment 2 of the present invention and FIG. 3 is a right side view of a projection type display device according to Embodiment 2 of the present invention.

Figure 6:
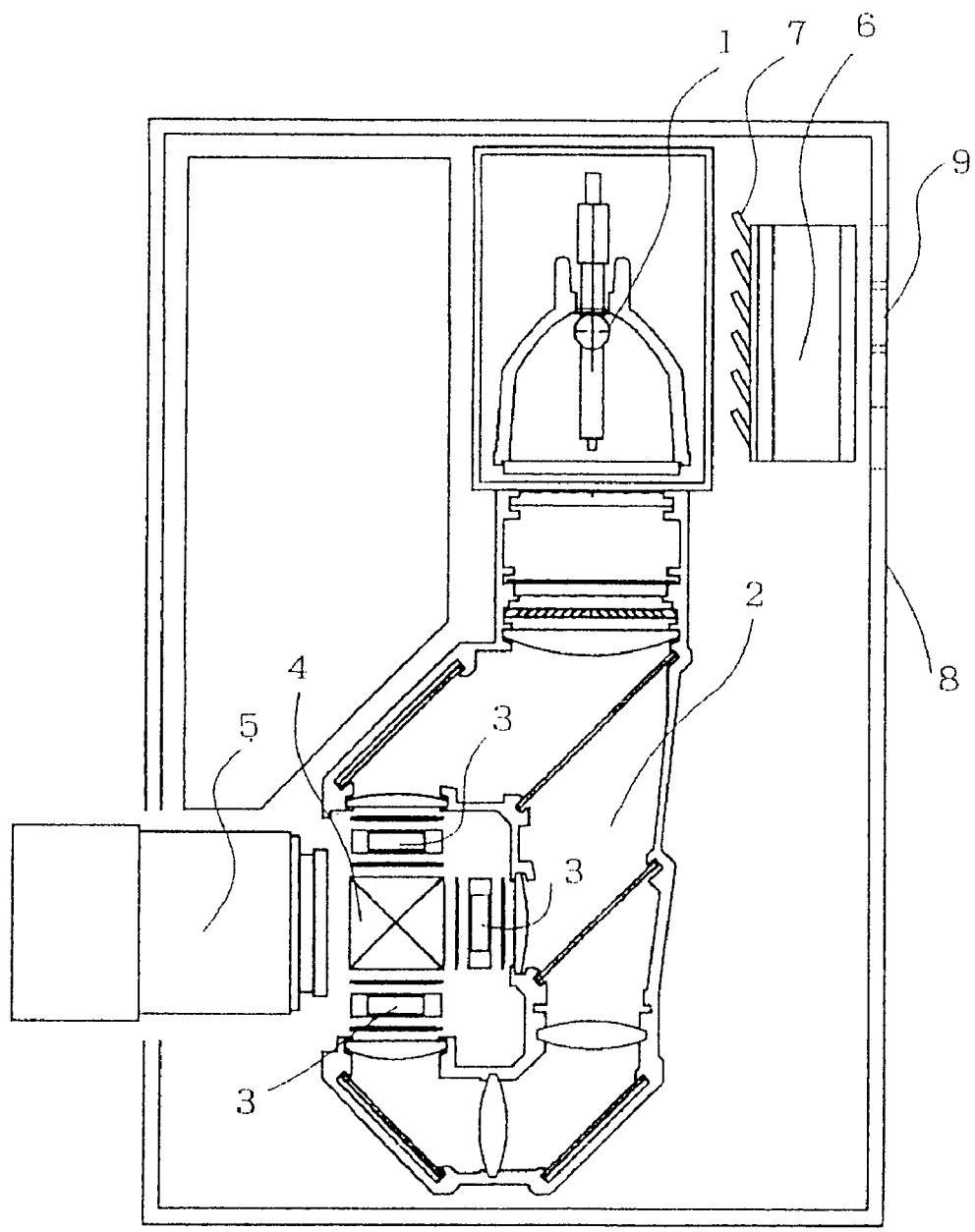
FIG. 6 is a plan view of a conventional projection type display device.
Figure 7:
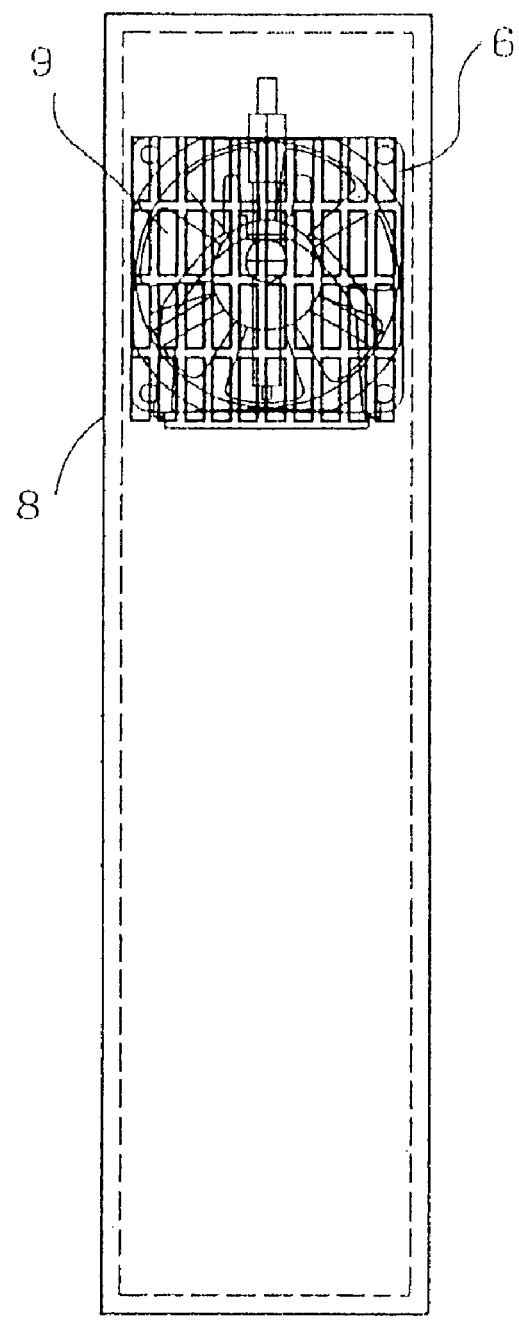
FIG. 7 is a right side view of the conventional projection type display device.

Here, the same means as the means of a conventional projection type display device (see FIGS. 6 and 7) are assigned the same reference numerals.

FIG. 2 shows a projection type display device provided with a light source lamp unit 1, an irradiation optical unit 2 that condenses light from the above-described light source lamp unit 1, three liquid crystal panel units 3 consisting of R, G and B liquid crystal panels for optically generating image information from the condensed light, a color combination system unit 4 that color-combines the optical information of the liquid crystal panel units 3, a projection optical unit 5 that enlarges and projects the image information onto a screen, a power supply unit (not shown) which serves as a drive source of the light source lamp unit 1 and the electrical system of the entire apparatus and an axial flow fan 201 that exhausts air for the light source lamp unit 1 and the entire apparatus.

The projection type display device of this embodiment uses the axial flow fan 201 having the same configuration as that of the axial flow fan explained in the above-described Embodiment 1 as the cooling fan intended to cool the light source lamp unit 1 and the entire apparatus. More specifically, the axial flow fan 201 is an axial flow fan for cooling the light source lamp unit that takes in and exhausts a high temperature atmosphere around the light source lamp unit 1, thereby appropriately cools and adjusts temperature of a high temperature section of the light source lamp unit 1.

Here, since the axial flow fan 201 is placed separated (indented) toward the inside of the housing 8 by a predetermined distance from an exhaust opening 9, a light-shielding characteristic in a direction diagonal to the rotation axis of a motor of the axial flow fan 201 is improved.

By the way, the means including the light source lamp unit 1 corresponds to the light-emitting means of the present invention, the means including the projection optical unit 5 corresponds to the projecting means of the present invention and the axial flow fan 201 corresponds to the fan apparatus of the present invention. Furthermore, the housing 8 corresponds to the housing of the present invention and the exhaust opening 9 corresponds to the opening of the present invention. Furthermore, the projection type display device of this embodiment corresponds to the projection type display device of the present invention.

Then, an operation of the projection type display device of this embodiment will be explained.

The projection type display device of this embodiment (1) leads the outgoing light from the light source lamp unit 1 to the three liquid crystal panel units 3 each consisting of components R, G and B, which are light bulbs, using the irradiation optical unit 2 to decompose the outgoing light into the color components R, G and B, and forms image information and (2) combines the R, G and B components at the color combination system unit 4 and then projects the combined light onto a screen, etc., using the projection optical unit 5.

As in the case of aforementioned Embodiment 1, the entire set is cooled and the light source lamp unit 1 is adjusted to an optimum temperature by exhausting the high temperature atmosphere of the light source lamp unit 1 through the rotation of the propeller blades of the axial flow fan 201 formed in such a way that mutually neighboring propeller blades overlap with each other in a projective view from the axial direction.

Since the neighboring propeller blades overlap with each other in a projective view from the axial direction, the light-shielding member to prevent unnecessary light from the light source lamp unit 1 from leaking out of the set is no longer necessary. Furthermore, it is possible to cool the light source lamp unit and its periphery at high efficiency without allowing the unnecessary light components of the light source lamp unit to leak out of the apparatus.

Furthermore, cooling which would be attained through high-speed rotation of the exhaust fan can be realized through low-speed rotation. This makes it possible to reduce NZ noise of the fan (blade passing frequency N*Z which is defined as the product of the number N of revolutions of the fan and the number Z of fan blades is a frequency indicating the component of interference sound generated by rotation of the fan) to an extremely low level and has an advantage of being able to reduce noise of the entire apparatus to an extremely low level without deteriorating the cooling performance. Furthermore, since light from the light source lamp unit hardly leaks out of the set, it is possible to realize a projection type display device of high quality.

Of course, applying conduction processing to the air blowing means of the axial flow fan 201 drastically reduces the possibility that noise as unnecessary radiation leaks outward.

Thus, the projection type display device of this embodiment is a projection type display device provided with a light source, light bulbs that receive outgoing light from the light source and form an optical image, a projection lens that receives the outgoing light from the light bulbs and projects the optical image onto a screen and cooling means of cooling the light source and periphery of the light source, characterized in that the aforementioned axial flow fan is used as the cooling means of cooling the light source and periphery of the light source.

The projection type display device characterized as shown above in a configuration with a high degree of freedom without using any light-shielding member or dust-proof member can (1) effectively cool the device without letting out unnecessary light such as light from the light source lamp unit, (2) prevent dust from entering the set, (3) drastically reduce noise caused by air blowing without deteriorating the cooling performance because there is no more air blowing resistance by the light-shielding member or dust-proof member, (4) improve the quality of the set because it can be used as a cooling fan when it is desirable to make the interior of the set invisible to the user, and (5) promote price-reduction or down-sizing by eliminating the need for the light-shielding member or dust-proof member and thereby reducing the number of parts.

Embodiment 3

Figure 4:
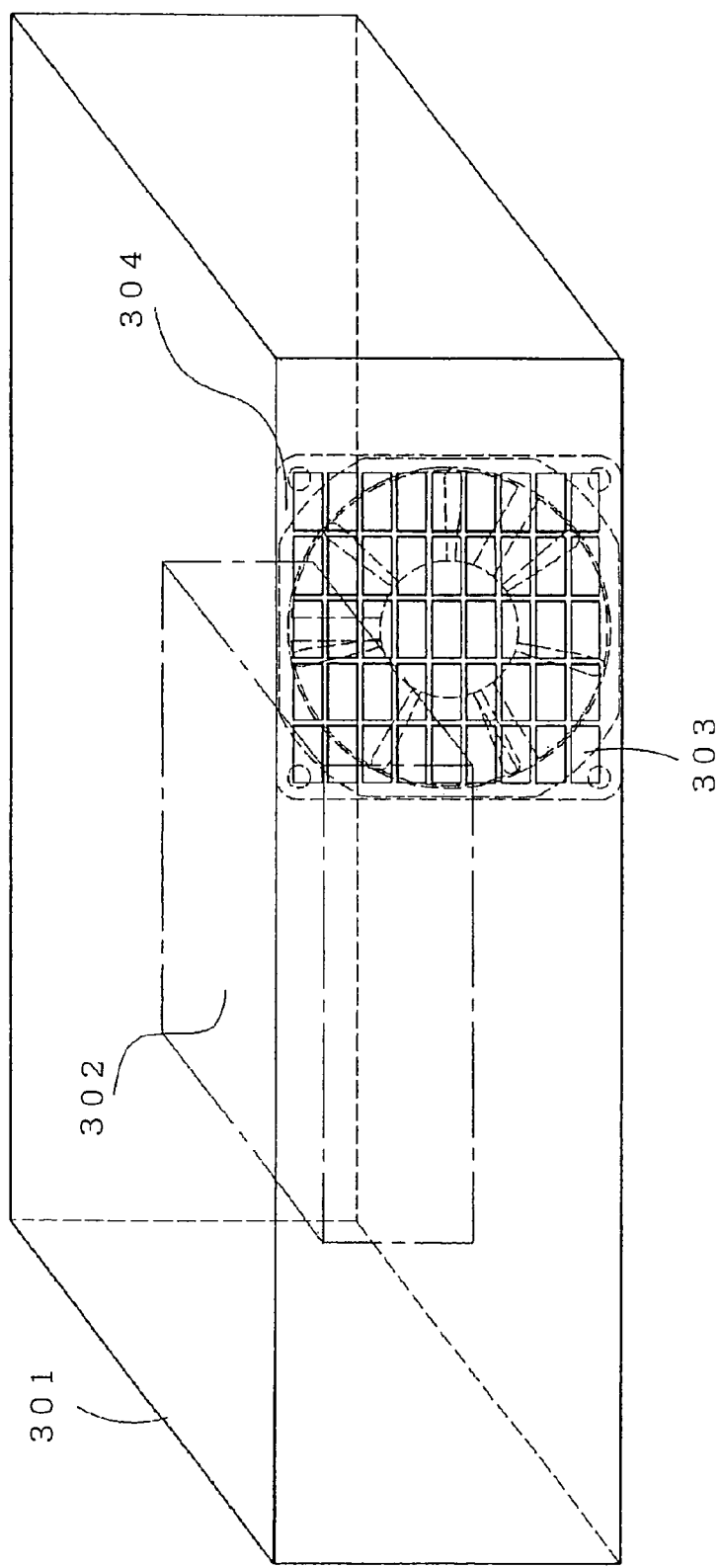
FIG. 4 is a perspective view of an electronic device according to Embodiment 3 of the present invention.
Figure 5:
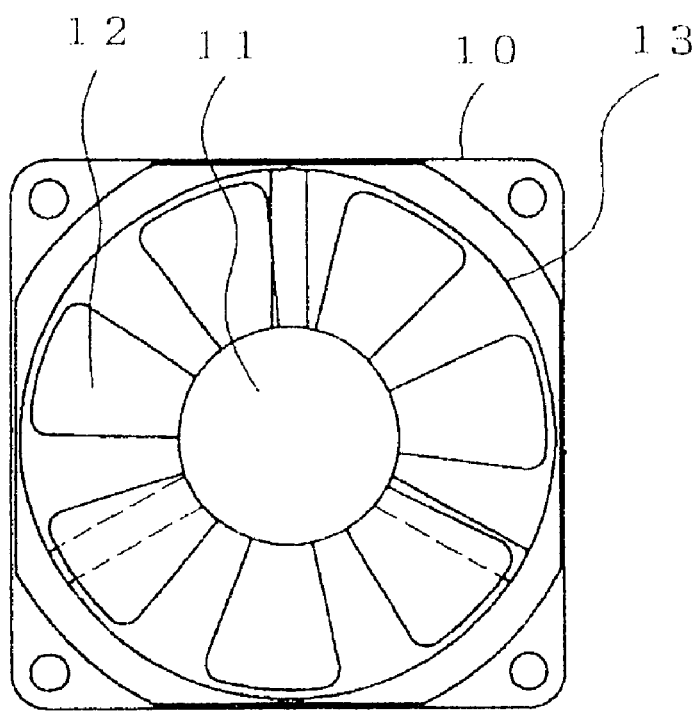
FIG. 5 illustrates a conventional axial flow fan.

First, a configuration of an electronic device of this embodiment will be explained mainly with reference to FIG. 4. FIG. 4, is a perspective view of the electronic device according to Embodiment 3 of the present invention.

A housing 301 is a housing of an electronic device such as a personal computer.

Inside the housing 301 is one or a plurality of heating members 302 having such a large amount of heat generated that requires cooling at least by forced air cooling. For example, a circuit board with a drive IC mounted and CPU, etc., correspond to this heating material.

The housing 301 is provided with an air intake opening (not shown) to take in air outside the housing 301 and an exhaust opening 303 to exhaust a high temperature atmosphere from the interior of the housing 301.

An axial flow fan 304 is an axial flow fan for forced air cooling having the same configuration as that of the axial flow fan explained in the above-described Embodiment 1.

The exhaust opening 303 which serves as an opening to circulate air to ventilate or exhaust a high temperature atmosphere is formed inside the housing 301 and an axial flow fan 304 is placed inside the housing 301 facing the exhaust opening 303.

Here, the axial flow fan 304 is placed inside the housing 301 separated (indented) by a predetermined distance from the exhaust opening 303, which improves the light-shielding characteristic in a direction diagonal to the rotation axis of the motor of the axial flow fan 304.

Of course, it is also possible to provide an air intake opening to take in air outside the housing into the housing 301 and set the axial flow fan 304 inside the housing 301 facing the air intake opening.

Further, the means including the heating member 302 corresponds to a predetermined circuit of the present invention, the axial flow fan 304 corresponds to the fan apparatus of the present invention. Furthermore, the housing 301 corresponds to the housing of the present invention and the exhaust opening 303 corresponds to the opening of the present invention. Furthermore, the electronic device of this embodiment corresponds to the electronic device of the present invention.

Then, an operation of the electronic device of this embodiment will be explained.

Cooling of the heating member 302 installed inside is realized through the function and operation of the electronic device.

At this time, the axial flow fan 304 is driven to exhaust a high temperature atmosphere inside and cool the interior of the housing 301 and the heating member 302 and maintain them in a desired state.

Since the axial flow fan 304 is placed inside the housing 301 facing the exhaust opening 303, the light-shielding characteristic in a diagonal direction is improved as described above, making the interior of the housing 301 hardly visible from the outside through the exhaust opening 303.

Thus, by not only preventing dust, etc., from entering the electronic device but also making the interior invisible to the user, this embodiment has an advantage of eliminating internal wiring or any blinder material, etc.

Furthermore, since the mutually neighboring propeller blades of the axial flow fan 304 are formed in such a way as to overlap with each other in a projective view from the axial direction, even if a light-emitting member is provided inside, no light will leak outward.

Of course, applying conductive processing to the air blowing means of the axial flow fan 304 reduces the possibility to an extremely small level that noise as unnecessary radiation leaks outward.

By the way, the light transmission type liquid crystal panel units 3 of the projection type display device are light bulbs in the above-described embodiment, but they can also be light bulbs forming an optical image as the optical feature.

Furthermore, the electronic device in the above-described embodiment is a personal computer, but it can also be other electronic devices requiring cooling such as audio products and audiovisual devices.

As described above, the electronic device of this embodiment is provided with a housing including an air intake opening and air exhaust opening for forced air-cooling of a heating member to a desired state and cooling means of forced air-cooling at least at either the air intake opening or air exhaust opening inside the housing, characterized in that the aforementioned axial flow fan is used as the cooling means.

The electronic device having such features in a configuration without using any light-shielding member or dust-proof member, with a high degree of freedom can (1) efficiently cool the device without leaking unnecessary light from the light source lamp unit, etc., (2) prevent dust from entering the set, (3) drastically reduce noise caused by blowing without deteriorating the cooling performance because there is no more air blowing resistance due to the light-shielding member or dust-proof member, (4) improve the quality of the set because it can be used as a cooling fan when it is desirable to make the interior of the set invisible to the user, and (5) promote price-reduction or down-sizing by eliminating the need for the light-shielding member or dust-proof member and thereby reducing the number of parts.

So far, Embodiments 1 to 3 have been explained in detail.

Figure 8:
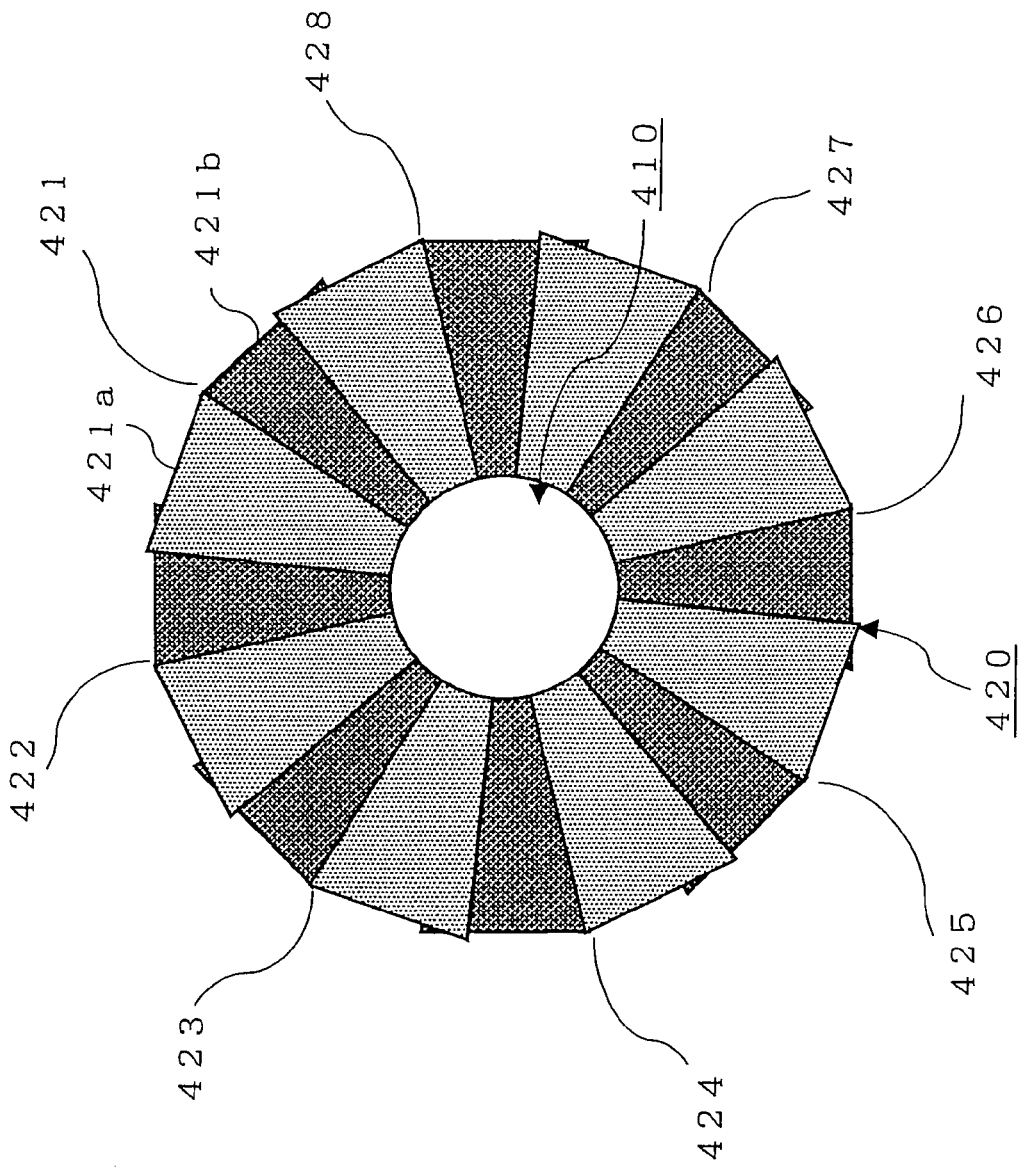
FIG. 8 illustrates a fan apparatus according to the present invention.

By the way, each propeller blade may also be constructed of a combination of two or more small propeller blades. For example, as shown in FIG. 8, which illustrates the fan apparatus of the present invention, the fan apparatus provided with (1) a rotor section 410 that can be rotated/driven around a predetermined rotation axis (in the direction perpendicular to the plane of this figure sheet), (2) a propeller section 420 attached to the rotor section 410, having propeller blades 421 to 428 arranged in such a way as to substantially shield light parallel to the rotation axis, is a specific example of the fan apparatus of the present invention. Here, for example, the propeller blade 421 has a configuration combining two small propeller blades 421a and 421b (to be easily understandable, the two small propeller blades are expressed in different display patterns).

Figure 9A:
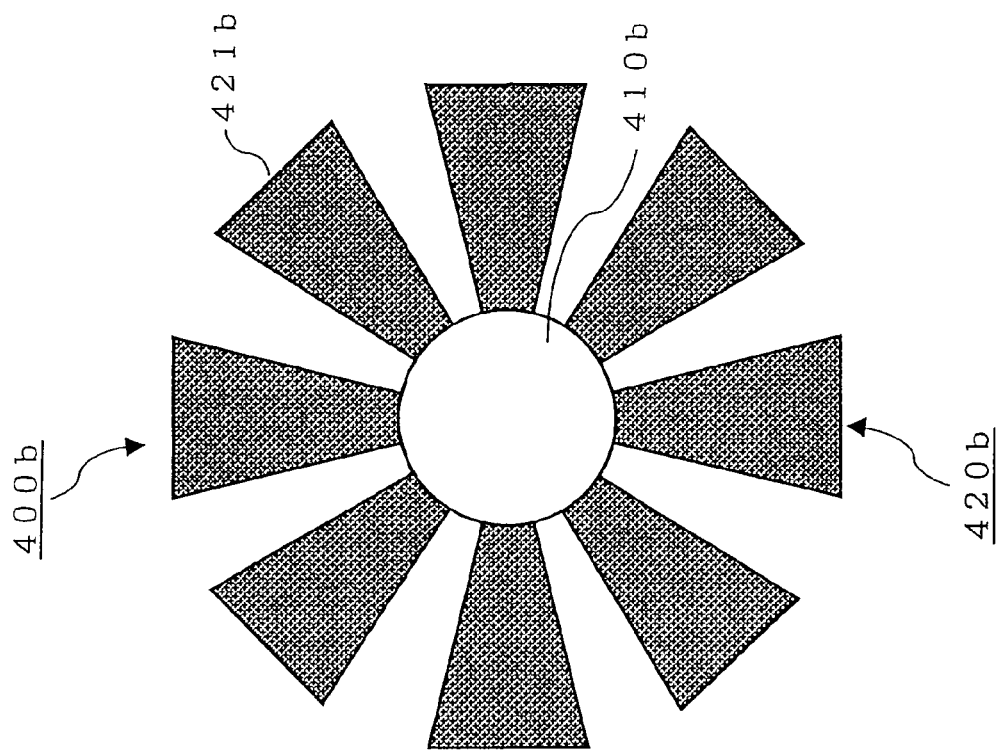
FIG. 9(a) illustrates a fan element 400a of the fan apparatus according to the present invention.
Figure 9B:
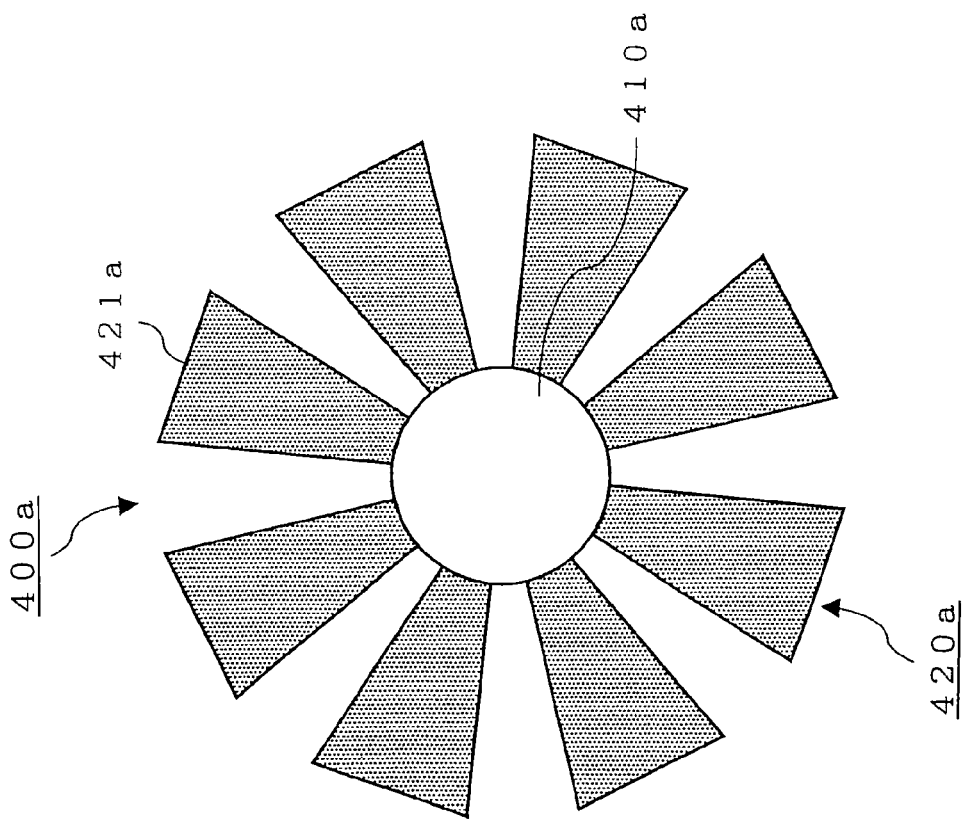
FIG. 9(b) illustrates a fan element 400b of the fan apparatus according to the present invention.

As shown in FIG. 9(a) which illustrates a fan element 400a of the fan apparatus of the present invention and FIG. 9(b) which illustrates a fan element 400b of the fan apparatus of the present invention, the method of manufacturing the fan apparatus (see FIG. 8) including (1) a fan element molding step of molding a fan element 400a made up of a rotor section element 410a that constitutes the rotor section 410 and a propeller section element 420a that constitutes the propeller section 420, and a fan element 400b made up of a rotor section element 410b that constitutes the rotor section 410 and a propeller section element 420b that constitutes the propeller section element 420 and (2) a rotor section element connecting step of connecting the rotor section elements 410a and 410b of the molded fan elements 400a and 400b, characterized in that when a connection is made, the individual smaller propeller blades of the propeller section elements 420a and 420b are arranged in such a way as to constitute the propeller blades 421 to 428, is a specific example of the method of manufacturing the fan apparatus of the present invention. Here, for example, the small propeller blades 421a and 421b making up the propeller blade 421 may also be connected using an adhesive or arranged without being connected in such a way that they overlap with each other when viewed from the direction of the rotation axis. Since the propeller section elements 420a and 420b have no small propeller blades overlapping with each other viewed from the rotation axis direction, it facilitates metal molding.

Figure 10:
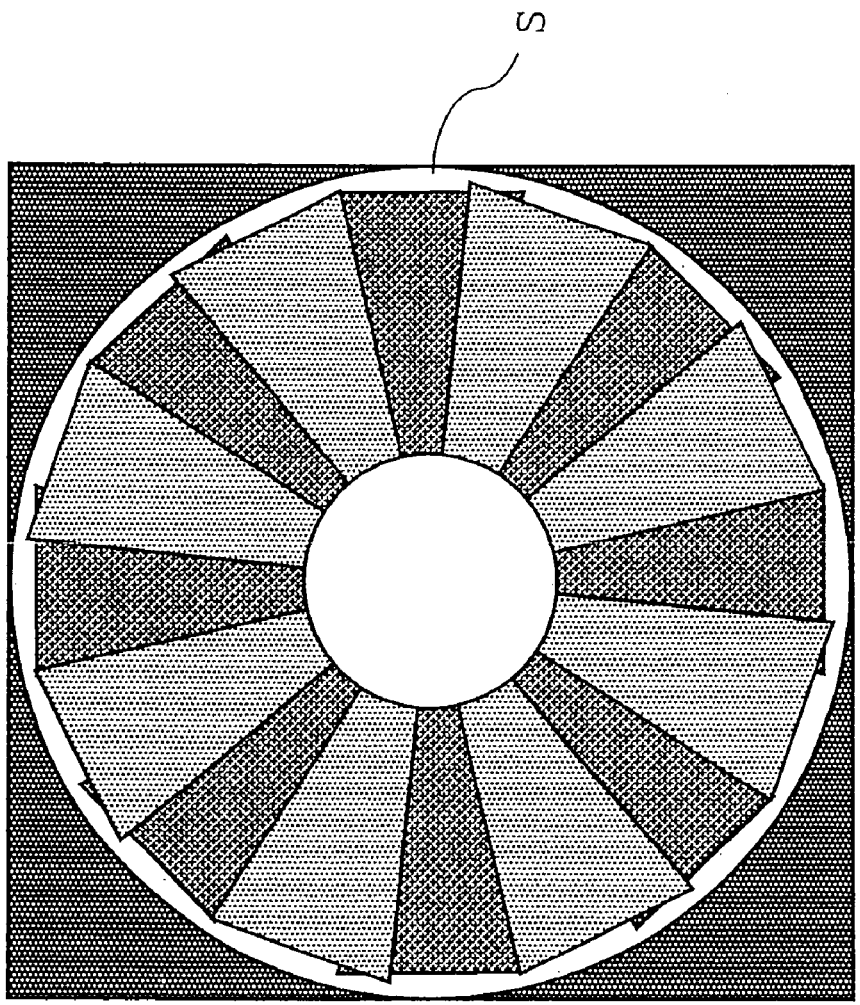
FIG. 10 illustrates a fan apparatus provided with a case 430 of the present invention.

Further, as shown in FIG. 10 which illustrates a fan apparatus provided with a case 430 of the present invention, the fan apparatus provided with the case 430 with the edges of the propeller blades surrounded with a predetermined space S and the front and back of the propeller blades left open, characterized in that (1) flanges (not shown) overhang on the front and/or back of the propeller blades in such a way as to shield light parallel to the rotation axis, which is incident or is to be incident upon the predetermined space S or (2) a motor support frame (not shown) attached to the case 430, for supporting a motor to rotate/drive the rotor section, is further provided and the motor support frame is provided with a predetermined light-shielding member (not shown) on the front and/or back of the propeller blades, in such a way as to shield light parallel to the rotation axis, which is incident or is to be incident upon the predetermined space S, is a specific example of the fan apparatus of the present invention. By shielding the predetermined space S using the flanges and light-shielding member, it is possible to suppress leakage of unnecessary light from inside the apparatus.

As is apparent from the above explanations, the present invention has an advantage of being able to eliminate the need for any light-shielding member and reducing the number of parts in a fan apparatus.

The invention claimed is:

1. A fan apparatus comprising:
    a rotor section capable of rotating/driving around a predetermined rotation axis;
    a propeller section attached to said rotor section, having a plurality of propeller blades; and
    a case which is housing the plurality of propeller blades;
    wherein the case having an air duct, the air duct having an opening in a direction of the rotation axis; and
    the plurality of propeller blades are constructed with no gap between the mutually neighboring propeller blades and between the propeller blades and the opening in a projective view from the direction of the rotation axis.

2. The fan apparatus according to claim 1,
    wherein a motor support frame attached to said case, for supporting a motor to rotate/drive said rotor section.

3. The fan apparatus according to claim 1, wherein each of said propeller blades is constructed of a combination of two or more small propeller blades.

4. A method of manufacturing the fan apparatus according to claim 1, comprising:
    a fan element molding step of molding a plurality of fan elements made up of a rotor section element that constitutes said rotor section and a propeller section element that constitutes said propeller section; and a rotor section element connecting step of connecting rotor section elements of said plurality of molded fan elements, wherein the individual propeller blades of said propeller section element are arranged in such a way as to constitute said propeller blades.

5. A projection type display device comprising:

light-emitting means of emitting light;

projecting means of projecting an optical image onto a predetermined screen using said emitted light; and said fan apparatus according to claim 1 for cooling at least said light-emitting means.

6. The projection type display device according to claim 5, further comprising a housing for housing said light-emitting means, said projecting means and said fan apparatus, wherein a wall section of said housing is provided with an opening that allows air intake and/or exhaust for said cooling, and said fan apparatus is placed separately toward the inside of said housing by a predetermined distance from said opening.

7. An electronic device comprising:

a predetermined circuit which operates with heat dissipation; and said fan apparatus according to claim 1 for cooling at least said predetermined circuit.

8. The electronic device according to claim 7, further comprising a housing for housing said predetermined circuit and said fan apparatus, wherein a wall section of said housing is provided with an opening that allows air intake and/or exhaust for said cooling, and said fan apparatus is placed separately toward the inside of said housing by a predetermined distance from said opening.

* * * * *